United States Patent
Abello Rosello et al.

(10) Patent No.: US 10,792,862 B2
(45) Date of Patent: Oct. 6, 2020

(54) RECIRCULATING FLUID IN A PRINTHEAD

(71) Applicant: Hewlett-Packard Development Company, L.P., Spring, TX (US)

(72) Inventors: Lluis Abello Rosello, Sant Cugat del Valles (ES); Joan Vidal Fortia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/476,247

(22) PCT Filed: Apr. 21, 2017

(86) PCT No.: PCT/US2017/028926
§ 371 (c)(1),
(2) Date: Jul. 5, 2019

(87) PCT Pub. No.: WO2018/194674
PCT Pub. Date: Oct. 25, 2018

(65) Prior Publication Data
US 2020/0031047 A1  Jan. 30, 2020

(51) Int. Cl.
*B41J 2/175* (2006.01)
*B29C 64/209* (2017.01)
(Continued)

(52) U.S. Cl.
CPC ............ *B29C 64/209* (2017.08); *B29C 64/35* (2017.08); *B41J 2/0458* (2013.01);
(Continued)

(58) Field of Classification Search
CPC .... B29C 64/209; B29C 64/35; B41J 2/04501; B41J 2/175; B41J 2202/12; B41J 2/04573; B41J 2/0458; B41J 2/04581; B41J 2/1404
See application file for complete search history.

(56) References Cited

U.S. PATENT DOCUMENTS

| | | | |
|---|---|---|---|
| 7,226,156 B2 | 6/2007 | Boyd et al. | |
| 8,128,190 B2 * | 3/2012 | Nishimura | B41J 2/175 347/14 |

(Continued)

FOREIGN PATENT DOCUMENTS

| | | |
|---|---|---|
| CN | 1623785 A | 6/2005 |
| CN | 102971150 A | 3/2013 |

(Continued)

OTHER PUBLICATIONS

International Search Report and Written Opinion dated Jan. 25, 2018, PCT Patent Application No. PCT/US2017/028926, filed Apr. 21, 2017, Federal Institute of Industrial Property, ISA/RU, 6 pages.

(Continued)

*Primary Examiner* — Yaovi M Ameh
(74) *Attorney, Agent, or Firm* — HP Inc. Patent Department

(57) ABSTRACT

A method of recirculating fluid in a printhead die is provided. The method comprises generating ejection data specifying a nozzle of the printhead from which a drop is to be ejected and storing the ejection data in a first memory. Recirculation data is generated for the nozzle for which a recirculation operation is to be performed, and the recirculation data is stored in a second memory different from the first memory. Fluid is recirculated in the nozzle on the basis of the recirculation data in advance of ejecting a drop from the nozzle on the basis of the ejection data. The recirculation data is generated based on the respective ejection data for the nozzle.

14 Claims, 6 Drawing Sheets

(51) Int. Cl.
*B41J 2/045* (2006.01)
*B41J 2/14* (2006.01)
*B29C 64/35* (2017.01)

(52) U.S. Cl.
CPC ....... *B41J 2/04501* (2013.01); *B41J 2/04573* (2013.01); *B41J 2/04581* (2013.01); *B41J 2/1404* (2013.01); *B41J 2/175* (2013.01); *B41J 2202/12* (2013.01)

(56) References Cited

U.S. PATENT DOCUMENTS

| | | | |
|---|---|---|---|
| 8,231,211 | B2 | 7/2012 | Okawa |
| 2003/0202073 | A1 | 10/2003 | Dowell et al. |
| 2004/0113996 | A1 | 6/2004 | Boyd et al. |
| 2008/0284809 | A1* | 11/2008 | Okawa ................ B41J 2/17596 347/17 |
| 2010/0327025 | A1 | 12/2010 | Yokoyama et al. |
| 2013/0057622 | A1* | 3/2013 | Govyadinov .......... B41J 2/1404 347/85 |
| 2015/0070446 | A1 | 3/2015 | Taff et al. |
| 2015/0091989 | A1 | 4/2015 | Govyadinov et al. |

FOREIGN PATENT DOCUMENTS

| | | |
|---|---|---|
| CN | 103826860 A | 5/2014 |
| CN | 104228349 A | 12/2014 |
| CN | 104245323 A | 12/2014 |
| CN | 104302483 A | 1/2015 |
| CN | 106393987 A | 2/2017 |
| EP | 0448967 A1 | 10/1991 |
| JP | 10315488 A | 12/1998 |
| JP | 2012171308 | 9/2012 |
| JP | 2012187763 A | 10/2012 |
| JP | 2015147341 | 8/2015 |
| WO | WO 2013/079151 A1 | 6/2013 |
| WO | WO-2015152889 A1 | 10/2015 |
| WO | WO-2016068987 | 5/2016 |
| WO | WO-2016068987 A1 | 5/2016 |
| WO | WO-2018001441 A1 | 1/2018 |

OTHER PUBLICATIONS

Unknown, "The New PPSI Modular Recirculating Ink Supply", Prototype & Production Systems Incorporated, 2016, 1 page. <http://prototypesys.com/products-services/components-for-inkjet-integrators/modular-recirculating-ink-supply/>.

* cited by examiner

RECIRCULATING FLUID IN A PRINTHEAD

CLAIM FOR PRIORITY

The present application is a national stage filing under 35 U.S.C. § 371 of PCT application number PCT/US2017/028926, having an international filing date of Apr. 21, 2017, the disclosure of which is hereby incorporated by reference in its entirety.

BACKGROUND

Fluid ejection devices may be implemented in various applications, such as printheads in printing systems including inkjet printers. Some fluid ejection devices may recirculate fluid.

BRIEF DESCRIPTION OF THE DRAWINGS

Examples will be described, by way of example, with reference to the accompanying drawings in which corresponding reference numerals indicate corresponding parts and in which.

DETAILED DESCRIPTION

Figure 1:
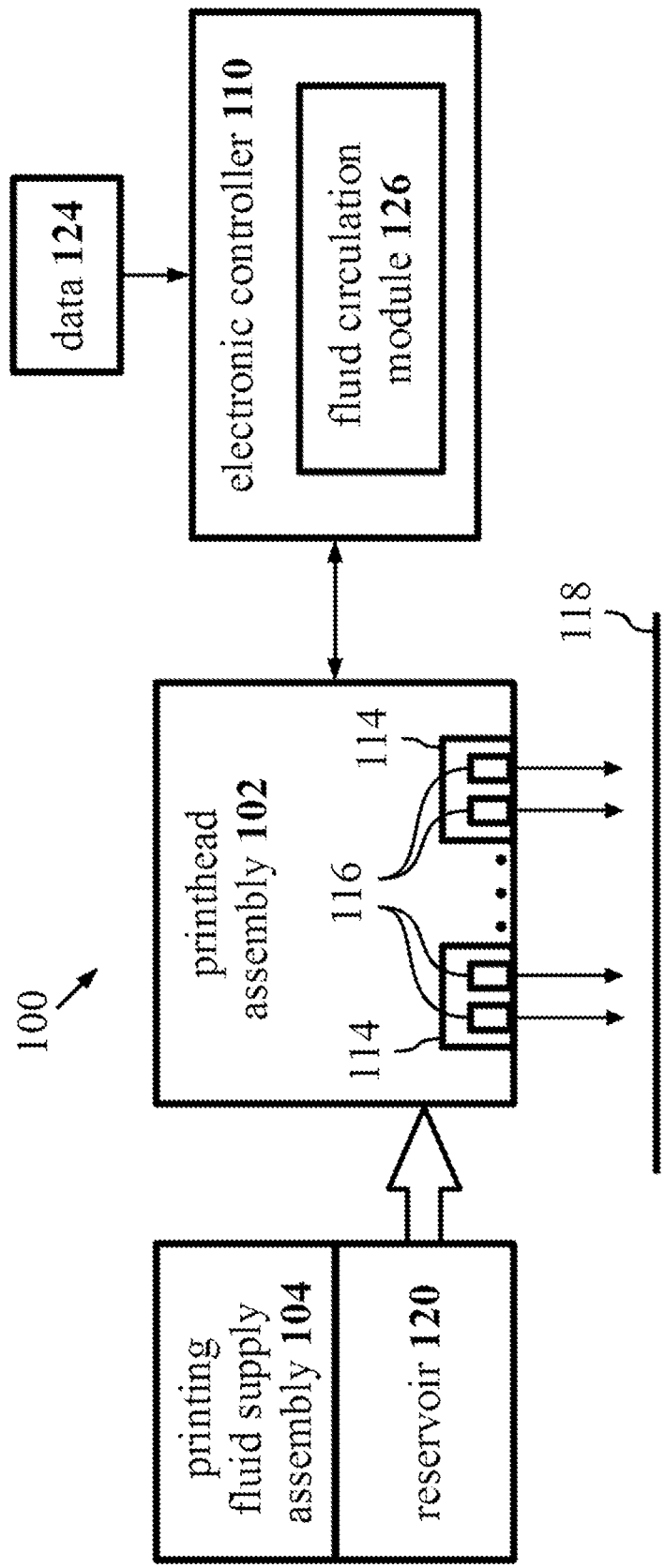
FIG. 1 is a block diagram of a printing system suitable for implementing an example method of recirculating fluid according to an example.

A printing system, including an inkjet printer or a 3D printer, may include a fluid ejection device, such as a printhead, a printing fluid supply which supplies printing fluid to the fluid ejection device, and a controller which controls the fluid ejection device. Fluid ejection devices, for example printheads, may provide drop-on-demand ejection of fluid drops. In some examples, fluid ejection devices may be implemented in printing systems to facilitate on-demand ejection of printing fluid drops.

Printing systems may produce images or object layers by ejecting printing fluid drops, for example drops of liquid ink or drops of print agents, through a plurality of orifices or nozzles onto a print medium. A print medium may be any kind of sheet-like medium, such as paper, cardboard, plastic or textile, etc., a web roll of such material, or a layer of print material in the case of a 3D printing system. Examples of printing fluids, may comprise ink, toner, colorants, varnishes, finishes, gloss enhancers, binders, and/or other such materials.

In some examples, a fluid ejection device may eject fluid from a nozzle by activating a fluidic actuator which is in fluid communication with the nozzle. In some examples, the actuator may comprise a thermal resistor element and drops of fluid may be ejected from the nozzle by passing electrical current through the resistor element to generate heat and vaporize a small portion of the fluid within an ejection chamber. Some of the fluid may be displaced by a vapor bubble and may be ejected through the nozzle. In some examples, the actuator may be a piezoelectric element and drops of fluid may be ejected from the nozzle by passing electrical pulses to the piezoelectric element, causing a physical displacement which may generate pressure pulses to force fluid out of the nozzle.

In some examples, printing fluid may cause blockage or clogging of a nozzle. For example a printing fluid blockage may occur if there is an excess of air that accumulates as air bubbles in the printhead. For example, when printing fluid is exposed to air, such as while the printing fluid is stored in a reservoir, additional air may dissolve into the printing fluid. The subsequent action of ejecting printing fluid drops from the ejection chamber of the printhead may release excess air from the printing fluid, which then may accumulate as air bubbles. The bubbles may move from the ejection chamber to other areas of the printhead where they may block the flow of printing fluid to the printhead and within the printhead. Bubbles in the ejection chamber absorb pressure, reducing the force on the fluid pushed through the nozzle, which may reduce drop speed or prevent ejection.

In some examples, inkjet printing systems may use pigment-based inks or dye-based inks as printing fluids. Pigment-based inks may also cause printing fluid blockage or clogging in printheads due to pigment-ink vehicle separation (PIVS). PIVS may be a result of water evaporation from ink in the nozzle area and pigment concentration depletion in ink near the nozzle area due to a higher affinity of pigment to water. During periods of storage or non-use, pigment particles may settle in the ink vehicle, which may impede or block ink flow to the ejection chambers and nozzles in the printhead.

In some examples, other factors related to situations in which an uncapped nozzle is exposed to ambient environments such that evaporation of water or solvent may cause PIVS and viscous ink plug formation, may degrade the ability of a nozzle to properly eject a drop of printing fluid.

Some examples of the present disclosure may reduce printing fluid blockage and/or clogging in printing systems by recirculating fluid between fluid supply slots (i.e. from slot-to-slot) or by recirculating fluid from ejection chamber to ejection chamber, slot to ejection chamber, pump chamber to slot, pump chamber to ejection chamber, etc.

FIG. 1 illustrates an example of a printing system 100 suitable for implementing fluid recirculation according to an example. The printing system 100 includes a printhead assembly 102, a printing fluid supply assembly 104, and an electronic controller 110. The various electrical components of printing system 100 may be connected with a power supply (not shown) that provides power thereto.

The printhead assembly 102 includes a fluid ejection device 114, such as a printhead 114, which ejects drops of printing fluid, for example liquid ink, through a plurality of orifices or nozzles 116 toward a print medium 118. The nozzles 116 may be arranged in one or more columns such that properly sequenced ejection of printing fluid from the nozzles 116 may cause, for example, characters, symbols, and/or other graphics or images to be printed on the print media 118 as the printhead assembly 102 and the print media 118 are moved relative to each other. The printing fluid supply assembly 104 may supply printing fluid to the printhead assembly 102 from a printing fluid reservoir 120 through an interface connection, such as a supply tube. The reservoir 120 may be removed, replaced, and/or refilled.

In some examples, the electronic controller 110 may include components of a standard computing system, such as a processor, memory, other electronics, and machine readable instructions for controlling the general functions of the printing system 100 and for communicating with and controlling components such as the printhead assembly 102. In some examples, the electronic controller 110 may receive data 124 from a host system, such as a computer, and may temporarily store data 124 in a memory. In some examples, the data 124 may be sent to the printing system 100 along an electronic, infrared, optical, or other information transfer path. The data 124 may represent, for example, a document, a file and/or a 3D object, to be printed. As such, the data 124 may form a print job for the printing system 100 and may include one or more print job commands and/or command parameters.

In some examples, the controller 110 may control the printhead assembly 102 to eject printing fluid drops from the nozzles 116. Thus, the electronic controller 110 may define a pattern of ejected printing fluid drops which may form, for example characters, symbols, and/or other graphics or images on the print media 118. A pattern of ejected printing fluid drops may be determined by the print job commands and/or command parameters. For example, the controller 110 may generate a series or a pattern of fire pulses that may be sent to fluidic actuators to determine the pattern of ejected printing fluid drops.

In some examples, the controller 110 may include a fluid circulation module 126 stored in a memory of the controller 110. The fluid circulation module 126 may execute on the controller 110, i.e. a processor of the controller 110, to control the operation of one or more pump actuators within the fluid ejection device 114. More specifically, in some examples, the controller 110 may execute instructions from the fluid circulation module 126 to control which pump actuators within the fluid ejection device 114 are active and which are not active. Controller 110 may also control the timing of activation for the pump actuators.

In other examples, the controller 110 may execute instructions from the fluid circulation module 126 to control the timing and duration of forward and reverse pumping strokes, i.e. compressive and expansive fluid displacements, of the pump actuators to control, for example, the direction, rate, and timing of fluid flow through fluidic channels between fluid feed slots within fluid ejection device 114.

In some examples, the printhead assembly 102 may include one fluid ejection device (printhead) 114. In other examples, the printhead assembly 102 may include a plurality of printheads 114. For example, the printhead assembly 102 may be a wide array or a multi-head printhead assembly. In one implementation of a wide-array assembly, the printhead assembly 102 may include a carrier that carries the printheads 114, provides electrical communication between the printheads 114 and the controller 110, and provides fluidic communication between the printheads 114 and the ink supply assembly 104.

In some examples, the printing system 100 may be a drop-on-demand thermal inkjet printing system wherein the fluid ejection device 114 is a thermal inkjet (TIJ) printhead. The thermal inkjet printhead implements a thermal resistor ejection element in an ink chamber to vaporize ink and create bubbles that force ink or other printing fluid drops out of a nozzle 116. In other examples, the printing system 100 may be a drop-on-demand piezoelectric inkjet printing system wherein the fluid ejection device 114 is a piezoelectric inkjet (PIJ) printhead that implements a piezoelectric material actuator as an ejection element to generate pressure pulses that force printing fluid drops out of a nozzle.

In some examples, recirculation is performed for at least one nozzle 116, such that the recirculation finishes before complete ejection of a drop by the corresponding nozzle(s) 116.

In some examples, recirculation for nozzle(s) 116 is performed by activating the corresponding recirculation pumps. In some examples, recirculation is performed for each nozzle separately and each nozzle is in communication with a corresponding pump. In some examples, one pump is provided for each nozzle. In other examples, one pump is provided for more than one nozzle. For example, one pump may be provided for two nozzles or for a group of nozzles comprising a plurality of nozzles, such as three or five nozzles, or in the order of 50 nozzles.

In some examples, the timing of recirculation is controlled such that the recirculation finishes before the corresponding nozzle(s) 116 eject a drop. For example, the timing may be controlled such that the recirculation finishes shortly before drop ejection, e.g. in the order of milliseconds before drop ejection. In other examples, the recirculation may finish during a start phase of drop ejection, but before complete ejection of the drop. For example, the recirculation may finish while the corresponding thermal actuator heats up printing fluid and/or while a bubble forms within the ejection chamber which starts to force printing liquid out of the nozzle.

In some examples, the print data 124 is processed in advance to determine which nozzle(s) 116 will eject a drop and/or when the corresponding nozzle(s) 116 will eject the drop.

Figure 2:
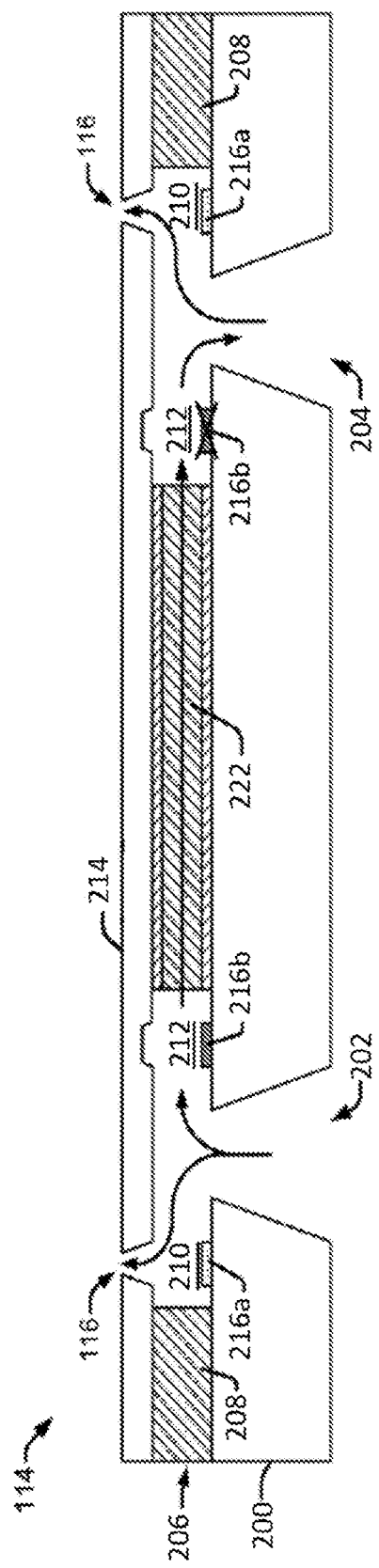
FIG. 2 is a cross-sectional view of a printhead, according to an example.

FIG. 2 is a cross-sectional view of a printhead 114 according to an example. The printhead 114 may include a die substrate 200, for example a silicon die substrate, with a first fluid supply slot 202 and a second fluid supply slot 204 formed therein. The fluid supply slots 202, 204 may be elongated slots that may be in fluid communication with a fluid supply (not shown), such as the fluid reservoir 120 described above with reference to FIG. 1.

In some examples, the printhead 114 may include a chamber layer 206 having walls 208 that define fluid chambers 210, 212, and that separate the substrate 200 from a nozzle layer 214 having nozzles 116. The fluid chambers 210 and 212 may comprise, respectively, fluid ejection chambers 210 and fluid pump chambers 212. The fluid chambers 210 and 212 may be in fluid communication with a fluid slot 202, 204. The fluid ejection chambers 210 have nozzles 116 through which fluid is ejected by actuation of a fluid ejection actuator 216a. The fluid pump chambers 212 are closed chambers in that they do not have nozzles through which fluid is ejected. Actuation of a fluid pump actuator 216b within a pump chamber 212 may generate fluid flow between the fluid supply slots 202 and 204.

Fluid displacement actuators 216 are described generally throughout the disclosure as being elements capable of displacing fluid in a fluid ejection chamber 210 for the purpose of ejecting fluid drops through a nozzle 116, and/or for generating fluid displacements in a fluid pump chamber 212 for the purpose of creating fluid flow between the fluid supply slots 202, 204.

One example of a fluid displacement actuator 216 is a thermal resistor element. When activated, heat from the thermal resistor element vaporizes fluid in the chamber 210, 212, causing a growing vapor bubble to displace fluid. Another example of a fluid displacement actuator 216 is a piezoelectric element. The piezoelectric element may include a piezoelectric material adhered to a moveable membrane formed at the bottom of the chamber 210, 212.

When activated, the piezoelectric material causes deflection of the membrane into the chamber 210, 212, generating a pressure pulse that displaces fluid.

In addition to thermal resistive elements and piezoelectric elements, other types of fluid displacement actuators 216 may also be suitable for implementation in a fluid ejection device 114 to generate, e.g. slot-to-slot fluid circulation. For example, printheads 114 may implement electrostatic (MEMS) actuators, mechanical/impact driven actuators, voice coil actuators, magneto-strictive drive actuators, and so on.

In some examples, as shown in FIG. 2, a fluid ejection device 114 may include fluidic channels 222. The fluidic channels 222 may extend from the first fluid slot 202 across the center of the die substrate 200 to the second fluid slot 204. In some examples, the fluidic channels 222 may couple the fluid pump chamber 212 of a first column with a fluid pump chamber 212 of a second column. The fluid pump chambers 212 may be in the fluidic channels 222 and may be considered to be part of the channels 222. Thus, each fluid pump chamber 212 may be located asymmetrically (i.e. off-centered) within a fluidic channel 222, toward an end of the fluidic channel 222.

As indicated in FIG. 2, some fluid pump actuators 216b are active and some are inactive. Inactive pump actuators 216b are designated with an "X". The pattern of active and inactive pump actuators 216b may be controlled by the controller 110 executing the fluid circulation module 126 (cf. FIG. 1) to generate fluid flow through the channel 222 to circulate fluid between the first slot 202 and the second slot 204. Direction arrows in FIG. 2 show which direction fluid flows through the channel 222 between the fluid supply slots 202, 204. The direction of fluid flow through a channel 222 may be controlled by activating one or the other of the fluid pump actuators 216b at the ends of the channel 222. Thus, various fluid circulation patterns can be established between the fluid supply slots 202, 204 by controlling which pump actuators 216b are active and which are inactive. For example, controlling groups of pump actuators 216b to be active and inactive generates fluid flowing from the first fluid supply slot 202 to the second fluid supply slot 204 through some channels 222, and from the second fluid supply slot 204 back to the first fluid supply slot 202 through other channels 222. The channels 222 in which no pump actuator 216b is active may have little or no fluid flow.

In some examples, recirculation pulses activate the pumps, such that flow of fluid may be generated. In some examples, the number of recirculation pulses is generated based on the processed print data. In some examples, the print data is processed in advance, such that the recirculation pulses are generated before complete ejection of a drop by the corresponding nozzle(s).

In some examples, the print data is processed in advance such that the controller knows in advance which nozzle(s) are about to eject a drop. In some examples, the controller may control the generation and application of recirculation pulses, such that in particular for those nozzle(s) which are about to eject a drop and which have been uncapped and exposed to ambient environments, i.e. for which the nozzle score exceeds a corresponding threshold, a recirculation is performed. Furthermore, in some examples, the pattern of recirculation pulses generated may be based at least in part on a respective recirculation threshold for which a respective nozzle has exceeded. For example, a first pattern of recirculation pulses may be generated for a respective nozzle if the respective nozzle exceeds a first recirculation threshold. Continuing the example, a second pattern of recirculation pulses may be generated for the respective nozzle if the respective nozzle exceeds a second recirculation threshold. It may be appreciated that patterns of recirculation pulses may differ in total duration, pulse duration, frequency, etc.

Figure 3:
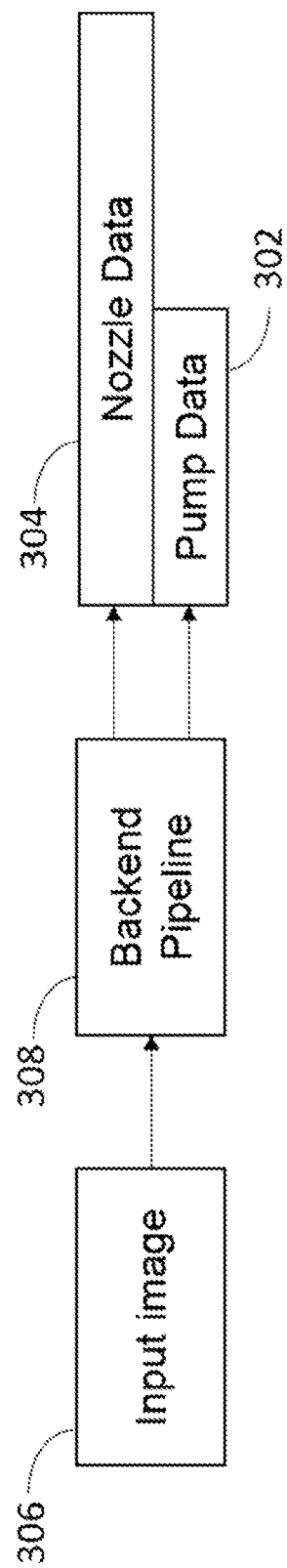
FIG. 3 is a block diagram, of a pipeline for performing recirculation according to an example.

FIG. 3 shows an example of a print data pipeline for generating recirculation pulses in advance of firing pulses. In some examples, it may be determined in advance whether a nozzle needs recirculation, so that the recirculation process may be performed before the drop is ejected. For example, some printheads contain several trenches, with a different color in each trench. A leading trench starts printing first and the others may be delayed so that the resulting image has all colors properly aligned on print media.

In existing implementations of recirculation methods, each trench may be split into two different virtual trenches. One virtual trench may contain some or all the nozzles and the other virtual trench may contain some or all the pumps. The two virtual trenches may process the same exact input image with the same exact configuration, such that they generate the same exact drops.

In the examples described herein, pump data, specifying which pumps are to activate for recirculation, and nozzle data, specifying which nozzles are to eject drops, are generated in a single process. This avoids processing the image data twice (i.e. once for each virtual trench) thereby reducing the bandwidth used to generate the pump data. Furthermore, this avoids the need to add blank columns in the nozzle data so that the recirculation is performed before ejection of a drop from a given nozzle.

The pump data is stored in a first memory, referred to herein as a pump data memory 302. The nozzle data is stored in a second memory, referred to herein as a nozzle data memory 304. The nozzle data memory 304 will keep the nozzle data for as long as needed to satisfy the longest delay supported between starting the micro-recirculation pumping and firing the associated nozzle.

In use, input image data 306 is received by a backend pipeline 308 which may comprise the controller 110. The backend pipeline 308 may be responsible for generating pump data to be stored in the pump data memory 302 and nozzle data to be stored in the nozzle data memory 302.

Storing the pump data in the pump data memory 302 separately from the nozzle data stored in the nozzle data memory 304 may enable, in some examples, the pump data to be compressed in the time domain. For example, instead of generating one bit per pump for every printing column, the pump data may simply indicate whether each pump is active or inactive. Compressing the pump data in this way may facilitate a reduction in size of the pump memory 302 used to store the pump data and may facilitate a reduction in the bandwidth used to transmit the pump data from the pump data memory 302 to the controller 110. In some examples, the controller 110 may be arranged subsequently to interpret the compressed pump data to form the recirculation pulses to apply to the pump actuators 216b.

In some examples, the backend pipeline 308 may retrieve the pump data and initiate the recirculation based on the pump data immediately after, or shortly after, the pump data has been generated and stored in the pump data memory 302. The backend pipeline may then be responsible for retrieving and acting on the nozzle data after a predetermined time, or after a predetermined number of columns have undergone recirculation.

Figure 4:
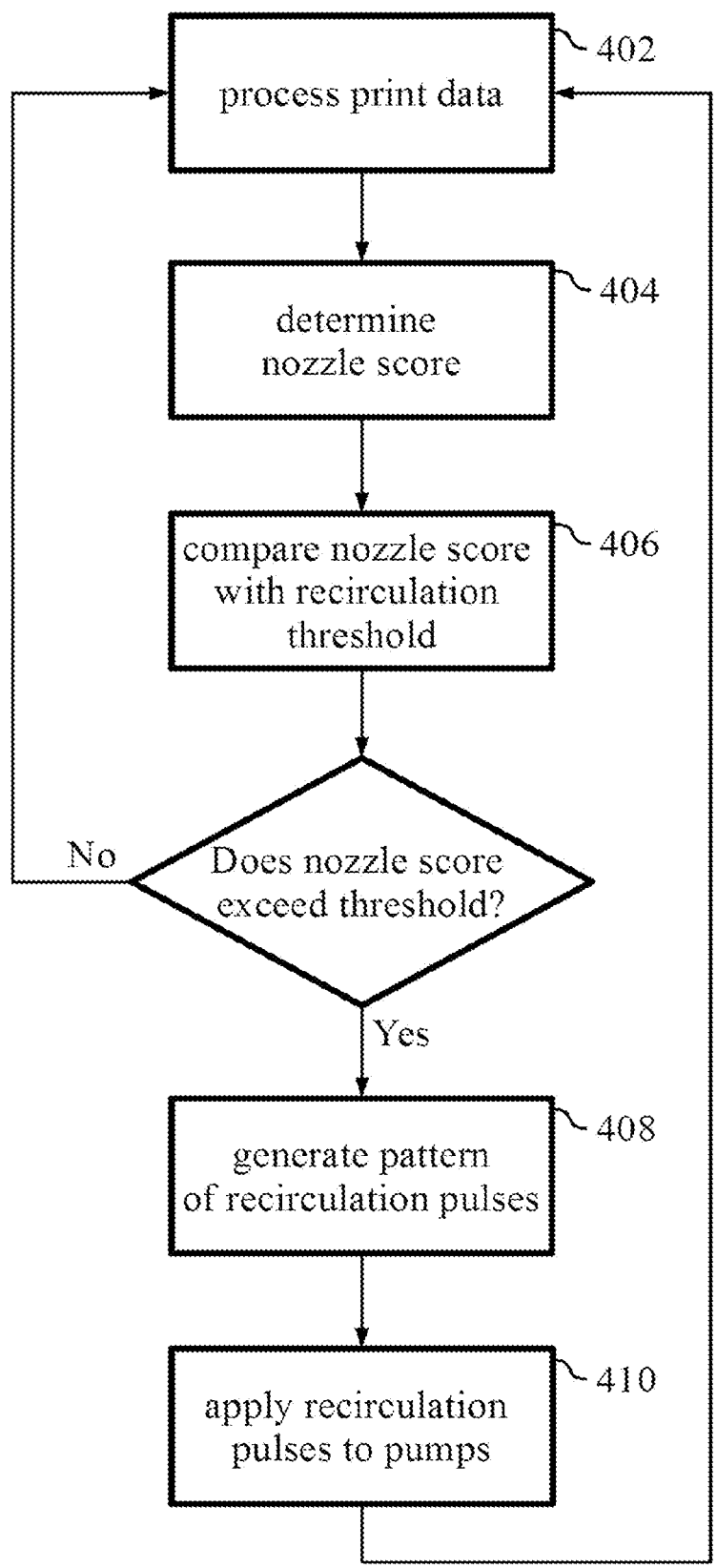
FIG. 4 is a flow diagram of an example method for recirculating fluid in a printhead die according to an example.

An example method 400 for recirculating fluid in a printhead die is depicted in FIG. 4.

As described above, an image may be printed onto a print medium by generating a series or pattern of fire pulses that activate fluidic actuators, which are in communication with corresponding nozzles. The fluidic actuators which are activated cause drops of printing fluid to be ejected through the corresponding nozzle onto the print medium, thereby printing characters or images to be printed.

The generation of fire pulses may be controlled by a controller. The controller may receive print data, which represents, for example, the image to be printed. The print data may be processed by the controller, e.g. by a processor of the controller, and forms a print job for the printing system including print job commands and/or command parameters. Thus, by processing the print data, the controller can control the timing of drop ejection and which nozzle(s) have to eject drops of printing fluid onto the print medium at what printing column.

Referring to FIG. 4, an example method 400 of recirculating fluid in a printhead die comprises, at box 402, processing of print data 124 (cf. FIG. 1). The print data 124 may be processed by the controller 110 (cf. FIG. 1), e.g. by a processor of controller 110. In some examples, the print data 124 may represent a document, a file, an image or an object to be printed. In some examples, the print data 124 may include one or more print job commands and/or command parameters. Thus, as explained above, by processing the print data 124, the controller 110 can control the timing of drop ejection and which nozzle(s) have to eject drops.

Referring to FIG. 4, the example method 400 comprises, at box 404, determining a nozzle score.

In some examples, a nozzle score is determined for each nozzle. In other examples, a nozzle score may be determined for a selected number of nozzles on a per nozzle basis. In some examples, a nozzle score may be determined for a group of nozzles comprising a number of nozzles.

In some examples, the nozzle score is determined to estimate the nozzle status, e.g. when it is about to print a drop. The nozzle status may be indicative of the how long the corresponding nozzle has been uncapped and exposed to ambient environments. If, for example, the nozzle has been uncapped and exposed to ambient environments for a long duration when it is about to print a drop, it may need recirculation in order to perform the drop ejection correctly.

In some examples, the nozzle score accumulates the number of blank columns since last drop. As explained above, inkjet printheads may encounter printing fluid blockage and/or clogging due to an excess of air that accumulates as air bubbles in the printhead. In some examples, pigment-based inks may also cause printing fluid blockage or clogging in printheads due to pigment-ink vehicle separation (PIVS). During periods of storage or non-use, pigment particles may settle or crash out of the ink vehicle, which may impede or block ink flow to the ejection chambers and nozzles in the printhead.

In some examples, the nozzles 116 are capped while the printer is not printing. While printing, however, the nozzles 116 remain uncapped, whether they are about to eject a drop or not. Thus, in some examples, a nozzle or a number of nozzles may remain uncapped and exposed to ambient environments while they are not ejecting drops for a number of columns, i.e. for a number of blank columns. Thus, the nozzle score may be converted in time of non-use of the corresponding nozzle(s) using the printing firing frequency. Accordingly, in some examples, a nozzle score for a particular nozzle may be based at least in part on a time between drop ejections performed with the particular nozzle. In other words, a nozzle score for a particular nozzle may be based at least in part on use and/or non-use of the particular nozzle, where such use and/or non-use for the particular nozzle may be determined based at least in part on the print data.

In some examples, the nozzles score may accumulate up to several seconds. In some examples, the nozzle score may be a print resolution. In other examples, the nozzle score may not be a print resolution.

Referring to FIG. 4, the example method 400 comprises, at box 406, comparing the nozzle score with a recirculation threshold.

In some examples, a recirculation threshold is provided. For example, one recirculation threshold may be provided. In other examples, more than one recirculation threshold, such as, e.g. four recirculation thresholds may be provided. For example, having more than one recirculation threshold may provide flexibility to address different nozzle situations.

In some examples, for each drop to be ejected it has to be determined whether the corresponding nozzle needs recirculation or not. In other examples, it may be determined whether the corresponding nozzle needs recirculation or not for a selected number of drops to be ejected, for example for every second drop or for one drop out of, e.g. ten drops to be ejected. In order to determine whether a nozzle or a group of nozzles needs recirculation or not, the recirculation threshold may be utilized. Therefore, in some examples, whether to perform recirculation for a particular nozzle may be determined immediately prior to drop ejection with the particular nozzle.

If the nozzle score exceeds the recirculation threshold before ejecting a drop, a recirculation process is produced, otherwise no recirculation needs to be performed, as shown at box 406 in FIG. 4.

In the case of more than one recirculation threshold, the nozzle score is compared to all or at least some of the recirculation thresholds. For example, if the nozzle score exceeds one of the recirculation thresholds, it may be determined whether another one of the recirculation thresholds is above the nozzle score or not.

For example, in the case of four recirculation thresholds, e.g. a first recirculation threshold $t_0$ of 4000, a second recirculation threshold $t_1$ of 3000, a third recirculation threshold $t_2$ of 2000, and a fourth recirculation threshold $t_3$ of 1000, it may be determined whether the nozzle score exceeds the first recirculation threshold. If it does, a recirculation process may be produced. If it does not exceed the first threshold, it may be determined whether it exceeds the second threshold, and so forth. As long as the nozzle score does not exceed a recirculation threshold, no recirculation process is produced. As soon as the nozzle score exceeded a particular threshold, a recirculation process is initiated and no further comparison of the nozzle score to remaining thresholds may be performed.

In some examples, a recirculation length is provided. For example, one recirculation length may be provided. In other examples, more than one recirculation lengths may be provided, such as two or more recirculation lengths. In some examples, a recirculation length is provided for each recirculation threshold that is provided.

The recirculation length may indicate the length of the recirculation process, i.e. its duration. In the case that a recirculation length is provided for each recirculation threshold, it may be possible to produce recirculation processes with different lengths (durations) depending on the nozzle score value, i.e. on the particular threshold that the nozzle score exceeds.

In some examples, a recirculation may be performed for each nozzle for which the nozzle score exceeds a corresponding recirculation threshold. In some examples, a recirculation may be performed a group of nozzles for which the nozzle score exceeds the corresponding recirculation threshold, or which comprises a number of nozzles for which the nozzle score exceeds the corresponding recirculation threshold.

For example, a group of nozzles may comprise a number of nozzles, e.g. 20 nozzles. A recirculation may be performed for this group of nozzles, e.g. for the particular 20 nozzles, if the nozzle score for a fraction of these nozzles, e.g. one half of the group of nozzles, i.e. 10 nozzles, exceeds the corresponding threshold. A recirculation may be performed for a group of nozzles when some or all nozzles of that group of nozzles are about to eject a drop. For example, a recirculation may be performed if a fraction of the nozzles of a group of nozzles is about to eject a drop and if the nozzle score for that group of nozzles or for some or all nozzles of that group exceeds a corresponding recirculation threshold.

A recirculation is initiated by generating a number of recirculation pulses, as indicated at box 408.

In some examples, the number of recirculation pulses is applied on one pump or pump actuator for each nozzle, as shown at box 410 in FIG. 4. For example, one pump may be provided for each nozzle and may be in communication with that nozzle. In other examples, one pump may be provided for a group of nozzles, such as two or more nozzles and that pump may be in communication with each nozzle of that group of nozzles. In some examples, the number of recirculation pulses is applied on more than one pump for each nozzle.

In some examples, heat may be built up in the printhead due to recirculation. In some examples, this built up heat, or at least part of it, is dissipated by the subsequent ejection of a drop.

In some examples, the recirculation pulses may actuate the pumps based directly on to-be-printed image areas without determining which particular nozzles are about to eject a drop.

In some examples, various flush "points" in a single die where heat is dissipated may be determined to initiate circulation in adjacent channels. In other examples, flush "areas" within a single die where heat is dissipated may be determined to initiate circulation in adjacent channels.

In some examples, recirculation during drop ejection may be avoided by timing the recirculation such that it finishes before drop ejection. In other examples, recirculation may finish during an initial start phase of drop ejection.

In some examples, recirculation is performed for nozzles which are about to print. For example, it may be avoided to perform recirculation for a nozzle that is not about to print for a while, even if the corresponding nozzle score exceeded a recirculation threshold, since the heat that may be built up during recirculation may not be dissipated by subsequent ejection of a drop.

In some examples, one recirculation frequency pattern is determined. In other examples, more than one recirculation frequency pattern may be determined.

A recirculation frequency is a frequency with which the recirculation pulses are sent to the pump actuators. The maximum recirculation frequency may be the same as the printing frequency for the fire pulses. The recirculation frequency may be a fraction of the fire frequency, e.g. one half the fire frequency. This may be achieved by not generating pulses for all the columns.

In some examples, pumps are digitally driven as the rest of nozzles, pulses may be generated in regular printing columns. Therefore, the maximum possible recirculation frequency may be the same as the print firing frequency. In this case, the train of pulses will contain a pulse in every single firing column. Lower frequencies can be achieved by not generating pulses in all the columns. In order to configure the recirculation frequency, a frequency pattern of a particular length, e.g. a 16-bit frequency pattern, may be provided. The train of pulses may be constructed by repeating this pattern all over the columns.

Figure 5:
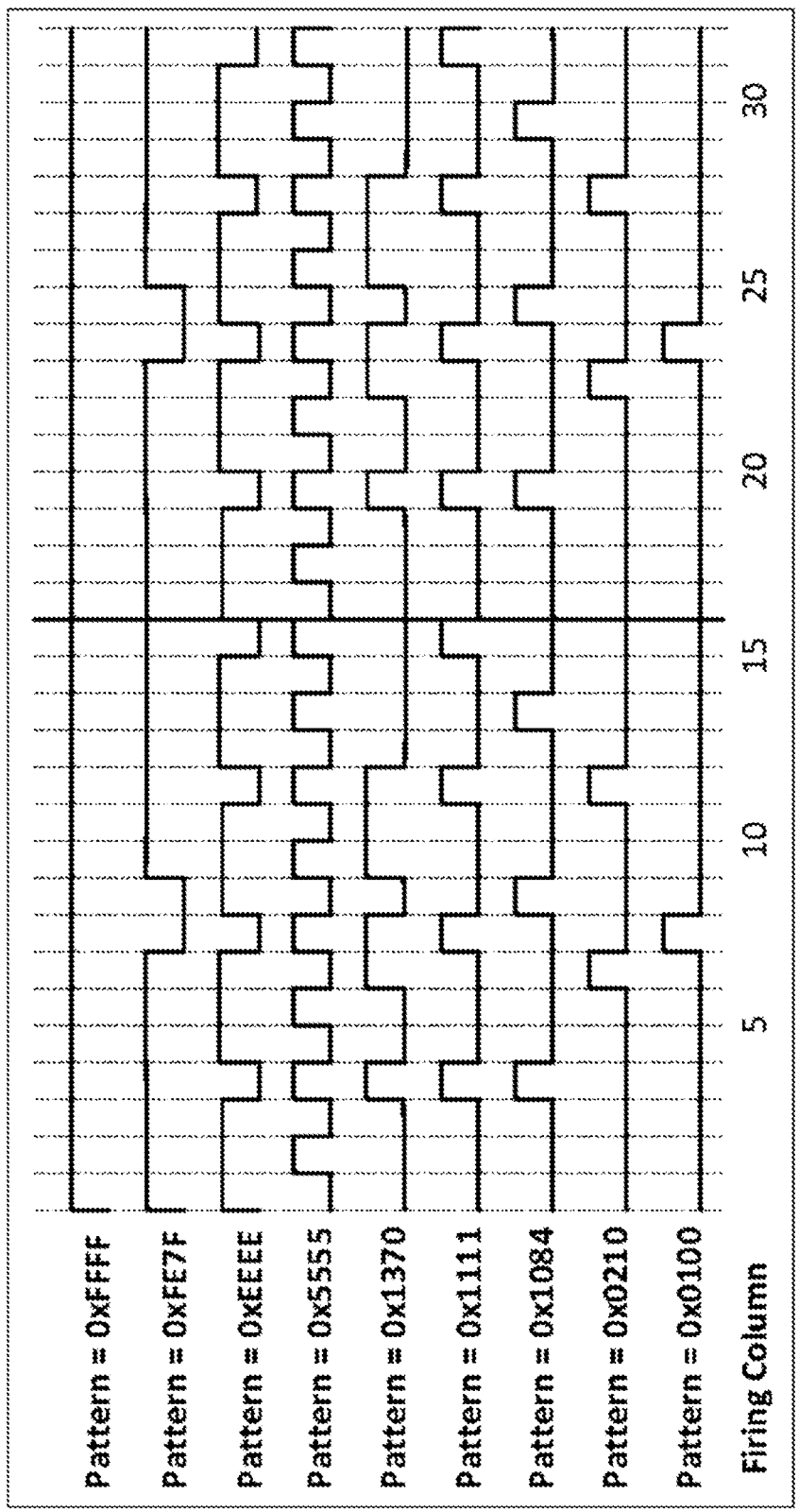
FIG. 5 is a timing diagram of recirculation frequency patterns according to an example.

FIG. 5 illustrates 32 columns of train of pulses for different frequency patterns. As it can be seen, the maximum frequency is achieved with pattern 0xFFFF. It is possible to reduce frequency to half or one forth with patterns 0x5555 or 0x1111, respectively. The recirculation frequency is determined by the number of bits asserted in the frequency pattern, so 16 different fractions of the print firing frequency may be possible.

Figure 6:
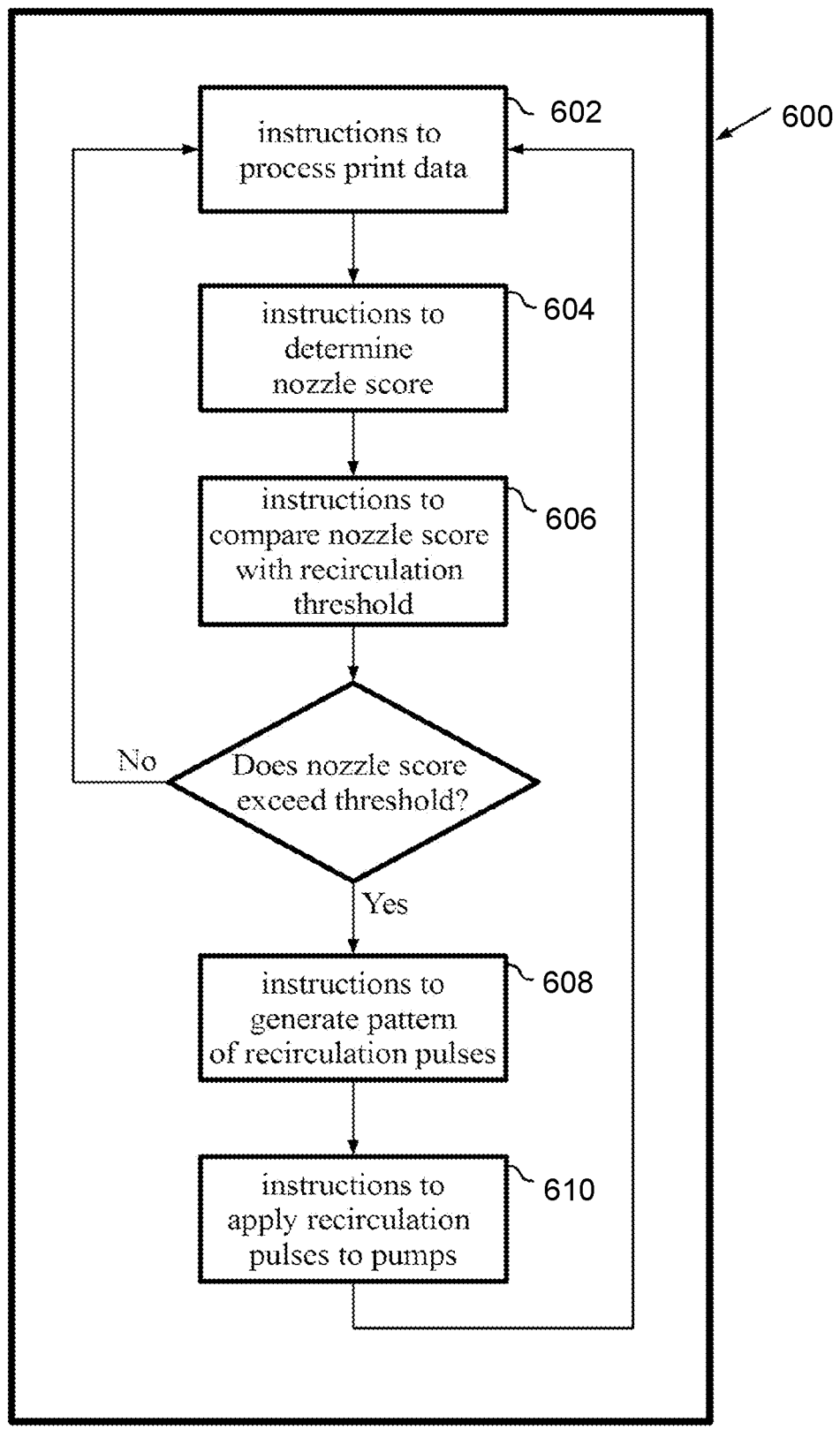
FIG. 6 is a block diagram of a non-transitory computer readable medium encoded with instructions according to an example.

FIG. 6 illustrates a non-transitory computer readable medium 600. The medium 600 may be any kind of non-transitory computer readable medium, such as, e.g. a CD-ROM or the like. In some examples, the medium 600 may be encoded with instructions 602. 604, 606, 608, 610. In some examples, the instructions may be executable by, e.g. a processor, for example a computer processor. In some examples, the medium 600 may be encoded with instructions 602 that, when executed by a processor, cause the processor to process print data. In some examples, the medium 600 may be encoded with instructions 604 that, when executed by a processor, cause the processor to determine a nozzle score. In some examples, the medium 600 may be encoded with instructions 606 that, when executed by a processor, cause the processor to compare the nozzle score with a recirculation threshold. In the case that the nozzle score does not exceed the threshold, the instructions may cause the processor to continue to process print data. Otherwise, in the case that the nozzle score does exceed the threshold, the instructions may cause the processor to generate a recirculation pattern, i.e. a pattern of recirculation pulses. For this reason, in some examples, the medium 600 may be encoded with instructions 608 that, when executed by a processor, cause the processor to generate a pattern of recirculation pulses. Moreover, in some examples, the medium 600 may be encoded with instructions 610 that, when executed by a processor, cause the processor to apply the recirculation pulses to pumps.

In some examples, a non-transitory computer readable medium encoded with instructions is provided, that, when executed by a processor, cause the processor to perform a method of recirculating fluid in a printhead die, wherein the recirculation is performed for at least one nozzle, such that the recirculation finishes before complete ejection of a drop by the corresponding at least one nozzle.

In some examples, the non-transitory computer readable medium is further encoded with instructions, that, when executed by a processor, cause the processor to determine a nozzle score for each nozzle. In some examples, the nozzle score accumulates the number of blank columns since the last drop for each nozzle.

In some examples, the non-transitory computer readable medium is further encoded with instructions, that, when executed by a processor, cause the processor to provide a recirculation threshold.

In some examples, the non-transitory computer readable medium is further encoded with instructions, that, when executed by a processor, cause the processor to determine a recirculation length for each recirculation threshold. For example, the processor may determine a recirculation length by determining how many recirculation cycles to perform based on a measure indicating a length of time since the one or more nozzles last ejected a drop.

In some examples, the non-transitory computer readable medium is further encoded with instructions, that, when executed by a processor, cause the processor to perform the recirculation for each nozzle for which the nozzle score exceeds the corresponding recirculation threshold or for each group of nozzles comprising a number of nozzles for which the nozzle score exceeds the corresponding recirculation threshold.

In some examples, the non-transitory computer readable medium is further encoded with instructions, that, when executed by a processor, cause the processor to apply a number of recirculation pulses on at least one pump for each nozzle or for each group of nozzles.

In some examples, the non-transitory computer readable medium is further encoded with instructions, that, when executed by a processor, cause the processor to process print data in advance and to generate the number of recirculation pulses based on the processed print data, such that the number of recirculation pulses finishes before complete ejection of a drop by the corresponding at least one nozzle.

In some examples, the non-transitory computer readable medium is further encoded with instructions, that, when executed by a processor, cause the processor to process the print data in advance to determine which nozzles will eject a drop and when the corresponding nozzles will eject the drop.

In some examples, the non-transitory computer readable medium is further encoded with instructions, that, when executed by a processor, cause the processor to determine a recirculation frequency pattern.

In some examples, the non-transitory computer readable medium is further encoded with instructions, that, when executed by a processor, cause the processor to perform the recirculation for each nozzle or group of nozzles by generating a number of recirculation pulses according to the recirculation frequency pattern and the corresponding recirculation length.

In some examples, a non-transitory computer readable medium encoded with instructions is provided, that, when executed by a processor, cause the processor to perform a method of recirculating fluid in a printhead die, wherein heat that has built up during the recirculation is dissipated by the ejection of a drop.

In some examples, a printing system is provided, comprising a printhead assembly including at least one printhead having a printhead die and at least one nozzle, a printing fluid supply assembly which is in fluid communication with the printhead assembly, and a controller, wherein the controller is to control a method of recirculating fluid in a printhead die, wherein the recirculation is performed for at least one nozzle, such that the recirculation finishes before complete ejection of a drop by the corresponding at least one nozzle.

In some examples, the controller of the printing system is further to determine a nozzle score for each nozzle. In some examples, the nozzle score accumulates the number of blank columns since the last drop for each nozzle.

In some examples, the controller of the printing system is further to provide a recirculation threshold.

In some examples, the controller of the printing system is further to determine a recirculation length for each recirculation threshold.

In some examples, the controller of the printing system is further to perform the recirculation for each nozzle for which the nozzle score exceeds the corresponding recirculation threshold or for each group of nozzles comprising a number of nozzles for which the nozzle score exceeds the corresponding recirculation threshold.

In some examples, the controller of the printing system is further to apply a number of recirculation pulses on at least one pump for each nozzle or for each group of nozzles.

In some examples, the controller of the printing system is further to process print data in advance and to generate the number of recirculation pulses based on the processed print data, such that the number of recirculation pulses finishes before complete ejection of a drop by the corresponding nozzles.

In some examples, the controller of the printing system is further to process the print data in advance to determine which nozzles will eject a drop and when the corresponding nozzles will eject the drop.

In some examples, the controller of the printing system is further to determine a recirculation frequency pattern.

In some examples, the controller of the printing system is further to perform the recirculation for each nozzle or group of nozzles by generating a number of recirculation pulses according to the recirculation frequency pattern and the corresponding recirculation length.

In some examples, the controller of the printing system is further to perform a method of recirculating fluid in a printhead die, wherein heat that has built up during the recirculation is dissipated by the ejection of a drop.

While several examples have been described in detail, it is to be understood that the disclosed examples may be modified. Therefore, the foregoing description is to be considered non-limiting.

What is claimed is:

1. A method of recirculating fluid in a printhead, the method comprising:
    generating ejection data specifying a nozzle of the printhead from which a drop is to be ejected and storing the ejection data in a first memory;
    generating recirculation data for the nozzle for which a recirculation operation is to be performed;
    storing the recirculation data in a second memory different from the first memory; and
    recirculating fluid in the nozzle on the basis of the recirculation data in advance of ejecting a drop from the nozzle on the basis of the ejection data,
    wherein the recirculation data is generated based on the respective ejection data for the nozzle.

2. The method of claim 1, wherein the recirculation data is generated to indicate whether the nozzle is to eject a drop during a print operation.

3. The method of claim 1, wherein a nozzle score is determined for the nozzle.

4. The method of claim 3, wherein the nozzle score accumulates a number of blank columns since the last drop for the nozzle.

5. The method of claim 3, wherein fluid recirculation is performed for the nozzle on the basis of the recirculation data and if the nozzle score exceeds a recirculation threshold.

6. The method of claim 1, wherein the fluid recirculation comprises applying a number of recirculation pulses to a pump for the nozzle.

7. The method of claim 2, wherein the print data is processed to determine whether the nozzle will eject a drop and when the nozzle will eject the drop.

8. The method of claim 1, wherein a recirculation frequency pattern is determined.

9. The method of claim 1, wherein the fluid recirculation is performed for the nozzle by generating a number of recirculation pulses according to a recirculation frequency pattern and a corresponding recirculation length.

10. The method of claim 1, wherein the printhead comprises plural nozzles and the method is performed in respect of each of the plural nozzles.

11. A printing system, comprising
a printhead assembly including a printhead;
a printing fluid supply assembly which is in fluid communication with the printhead assembly, and
a controller to:
generate ejection data specifying a nozzle of the printhead from which a drop is to be ejected and storing the ejection data in a first memory;
generating recirculation data for the nozzle for which a recirculation operation is to be performed;
store the recirculation data in a second memory different from the first memory; and
recirculate fluid in the nozzle using the recirculation data in advance of ejecting a drop from the nozzle.
wherein the recirculation data is generated based on the respective ejection data for the nozzle.

12. The printing system of claim 11, to receive print data and generate the ejection data and the recirculation data on the basis of the print data.

13. The printing system of claim 11, wherein the controller is further to compress the recirculation data stored in the second memory, wherein the recirculation data comprises a group of data bits representing firing signals for a group of nozzles and the compressing comprises replacing the group of data bits with a data bit indicating whether the group of nozzles is active or inactive.

14. A non-transitory computer readable medium encoded with instructions that, when executed by a processor, cause the processor to perform the method according to any of claim 1.

* * * * *